(12) United States Patent
Chamaret et al.

(10) Patent No.: US 10,204,432 B2
(45) Date of Patent: Feb. 12, 2019

(54) METHODS AND SYSTEMS FOR COLOR PROCESSING OF DIGITAL IMAGES

(71) Applicant: THOMSON LICENSING, Issy les Moulineaux (FR)

(72) Inventors: Christel Chamaret, Chantepie (FR); Dmitry Kuzovkin, Rennes (FR); Tania Pouli, Le Rheu (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/318,165

(22) PCT Filed: Jun. 11, 2015

(86) PCT No.: PCT/EP2015/063087
§ 371 (c)(1),
(2) Date: Dec. 12, 2016

(87) PCT Pub. No.: WO2015/189343
PCT Pub. Date: Dec. 17, 2015

(65) Prior Publication Data
US 2017/0116765 A1    Apr. 27, 2017

(30) Foreign Application Priority Data

Jun. 12, 2014  (EP) .................................... 14305889
Dec. 22, 2014  (EP) .................................... 14307124

(51) Int. Cl.
*G06K 9/00*    (2006.01)
*G06T 11/40*   (2006.01)
(Continued)

(52) U.S. Cl.
CPC .............. *G06T 11/40* (2013.01); *G06T 5/005* (2013.01); *G06T 5/50* (2013.01); *G06T 7/11* (2017.01);
(Continued)

(58) Field of Classification Search
None
See application file for complete search history.

(56) References Cited

U.S. PATENT DOCUMENTS 5,418,895 A * 5/1995 Lee ...................... H04N 1/6058
                                                         345/594
8,059,892 B1* 11/2011 Fan ......................... G06T 7/136
                                                         382/167
(Continued)

FOREIGN PATENT DOCUMENTS

EP       2168304        1/2009
WO    WO2009013420      1/2009

OTHER PUBLICATIONS

Baveye et al., "Saliency-Guided Consistent Color Harmonization", 4th Computational Color Imaging Workshop, Chiba, Japan, Mar. 3, 2013, pp. 105-118.

(Continued)

*Primary Examiner* — Hadi Akhavannik
(74) *Attorney, Agent, or Firm* — Jeffrey M. Navon

(57) ABSTRACT

Systems and methods of re-coloring digital images are disclosed. A system including a processor and a memory can execute stored instructions to obtain luminance information of a first image, e.g., an original grayscale image, and obtain color information of a second image, e.g., a colorized image of the original grayscale image. Multiple segmented image regions can be determined based on the luminance information of the first image. A color seed for each segmented image region can be determined based on the color information of the second image. A third image, e.g., a re-colored image, can be determined based on diffusing the color seeds of the segmented image regions.

17 Claims, 12 Drawing Sheets

(51) Int. Cl.

| | |
|---|---|
| *G06T 11/00* | (2006.01) |
| *G06T 7/11* | (2017.01) |
| *G06T 7/174* | (2017.01) |
| *G06T 7/90* | (2017.01) |
| *G06T 5/00* | (2006.01) |
| *G06T 5/50* | (2006.01) |

(52) U.S. Cl.
CPC ............... *G06T 7/174* (2017.01); *G06T 7/90* (2017.01); *G06T 11/001* (2013.01); *G06T 2207/10024* (2013.01); *G06T 2207/20016* (2013.01); *G06T 2207/20044* (2013.01); *G06T 2207/20156* (2013.01)

(56) References Cited

U.S. PATENT DOCUMENTS

| | | | | |
|---|---|---|---|---|
| 8,280,171 | B2* | 10/2012 | Pettigrew | G06T 7/12 345/589 |
| 8,363,908 | B2* | 1/2013 | Steinberg | G06K 9/00234 382/118 |
| 8,655,919 | B2 | 2/2014 | Cachin et al. | |
| 8,769,395 | B2* | 7/2014 | Boliek | G06K 9/00463 382/232 |
| 9,547,908 | B1* | 1/2017 | Kim | G06T 5/20 |
| 2008/0056564 | A1* | 3/2008 | Lindbloom | G06K 9/4652 382/162 |
| 2012/0033875 | A1* | 2/2012 | Bergman | G06T 7/0081 382/164 |
| 2012/0096564 | A1* | 4/2012 | Li | G06F 21/64 726/26 |

OTHER PUBLICATIONS

Kong et al., "Topological Algorithms for Digital Image Processing", Elsevier Science, Amsterdam, Netherlands, 1996, pp. 1-302.

Gupta et al., "Image Colorization Using Similar Images", 20th ACM International Conference on Multimedia, Nara, Japan, Oct. 29, 2012, pp. 369-378.

Levin et al., "Colorization using Optimization", ACM 31st International Conference on Computer Graphics and Interactived Techniques (SIGGRAPH), Los Angeles, California, USA, Aug. 8, 2004, pp. 689-694.

Pitie et al., "Automated colour grading using colour distribution transfer", Computer Vision and Image Understanding, vol. 107, Jan. 2007, pp. 123-137.

Papadakis et al., "A Variational Model for Histogram Transfer of Color Images", IEEE Transactions on Image Processing, vol. 20, No. 6, Jun. 2011, pp. 1682-1695.

Cohen-Or et al., "Color Harmonization", ACM 33rd International Conference on Computer Graphics and Interactived Techniques (SIGGRAPH), Boston, Massachusetts, USA, Jul. 30, 2006, pp. 624-630.

Rabin et al., "Artefact-free Color and Contrast Modification," IEEE Transactions on Image Processing (TIP), vol. 20, No. 11, Apr. 2011, pp. 3073-3085.

Achanta et al., "SLIC Superpixels Compared to State-of-the-art Superpixel Methods", Journal of LATEX Class Files, vol. 6, No. 1, Dec. 2011, pp. 1-8.

Anonymous, "OMAC page", www.nuee.nagoya-u.ac.jp/labs/tiwata/omac/omac.html, Dec. 30, 2014, pp. 1-9.

Quist et al., "Covert Debugging Circumventing Software Armoring Techniques", BlackHat USA, Aug. 2007, pp. 1-5.

Anonymous, "Application Protection Products/ Arxan", http://www.arxan.com/products/overview/, Jan. 2015, pp. 1-3.

Rogaway, "PMAC—A Parallelizable MAC", http://web.cs.ucdavis.edu/~rogaway/ocb/pmac.htm/, Mar. 30, 2015, pp. 1.

Gauge et al., "Automated Colorization of Grayscale Images Using Texture Descriptors and a Modified Fuzzy C-Means Clustering", Journal of Intelligent Learning Systems and Applications, vol. 4, May 2012, pp. 135-143.

Levin et al., "Colorization Using Optimization", ACM Transactions on Graphics (TOG), vol. 23, No. 3, 2004, pp. 1-39.

Liu et al., "Intrinsic Colorization", ACM Transactions on Graphics (TOG), vol. 27, No. 5, Dec. 2008, Article 152, pp. 1-9.

Maslennikova et al., "Interactive Local Color Transfer Between Images", 2007 Graphicon Conference, Moscow, Russia, Jun. 23, 2007, pp. 1-4.

Zhou, "Example Based Colorization Using Optimization", Brown University, Oct. 31, 2014, pp. 1-6.

Drew et al., "Realistic Colorization via the Structure Tensor",15th IEEE International Conference on Image Processing, San Diego, California, USA, Oct. 12, 2008, pp. 457-460.

Lefebvre et al., "A Survey of Color Mapping and its Applications", Eurographics 2014, Strasbourg, France, Apr. 7, 2014, pp. 1-25.

European Search Report for European Patent Application No. 14307124, dated Jun. 26, 2015, pp. 1-5.

* cited by examiner

GRAYSCALE IMAGE 300

COLORIZED IMAGE 800

METHODS AND SYSTEMS FOR COLOR PROCESSING OF DIGITAL IMAGES

This application claims the benefit, under 35 U.S.C. § 365 of International Application PCT/EP2015/063087, filed 11 Jun. 2015, which was published in accordance with PCT Article 21(2) on 17 Dec. 2015, in English, and which claims the benefit of European Patent Application No. 14307124.9 filed 22 Dec. 2014 and European Patent Application No. 14305889.9, filed 12 Jun. 2014, herein incorporated by reference.

TECHNICAL FIELD

The present disclosure generally relates to methods and systems for color processing of digital images and, more particularly, to methods and systems that re-color digital images that have undergone previous image processing.

BACKGROUND

Conventional processes for colorization of grayscale images and re-coloring of color images can produce visual artifacts in the resulting image. For example, conventional colorizing processes, particularly automatic color image processing/mapping methods, such as color transfer and color harmonization, can produce color inconsistency in areas where the color and/or luminance values change smoothly in the original image. Thus, strong artificial color edges that do not exist in the original image may be created in the resulting image. In addition, other types of image processing that do not modify color directly can also produce visual artifacts that affect the color of an image.

SUMMARY

Described herein are various systems and methods for digital image re-coloring that may eliminate or reduce visual artifacts in images that have undergone conventional colorization, re-coloring, or other image processing that affects image color. For example, an original grayscale image (or original color image) may undergo a colorization process (or re-color process) to result in a colorized image (or re-colored image). In various embodiments, luminance information of a first image (e.g., an original grayscale or color image) can be obtained, and color information of a second image (e.g., a colorized or re-colored image resulting from image processing of the first image) can be obtained. Multiple segmented image regions can be determined based on the luminance information of the first image. A color seed can be determined for each segmented image region based on the color information of the second image. The color seeds can represent, for example, a predominant color of the segmented image region in the second image (e.g., the colorized or re-colored image). A third image (e.g., a color-corrected image) can be determined based on diffusing the color seeds of the segmented image regions. In this regard, various embodiments can be viewed as a regularization method that can be implemented as a post-processing for improving the visual quality of any color image processing method. In this way, for example, visual artifacts resulting from colorization, re-coloring, or other image processing may be reduced or eliminated.

It should be understood that the drawings are for purposes of illustrating the concepts of the disclosure and are not necessarily the only possible configurations for illustrating the disclosure.

DETAILED DESCRIPTION

Processes for colorization of grayscale images, re-coloring of color images, and other types of image processing can produce visual artifacts in the color of resulting images. Described herein are various systems and methods for colorizing and re-coloring that may produce resulting images with fewer or no visual artifacts.

In various embodiments, the techniques may be used as stand-alone methods for colorization and/or re-coloring digital images. In various embodiments, the techniques can be implemented as post-processing to help correct visual artifacts that can result from other colorizing or re-coloring processes. Some conventional methods might, for example, produce color inconsistency in areas where the color and/or luminance values change smoothly in the original image. Thus, strong artificial color edges that do not exist in the original image may be created in the resulting image. In this regard, various embodiments can be implemented as a regularization method that can be seen as a post-processing technique for improving the visual quality of any color image processing method. Algorithms, such as color transfer, color harmonization, etc., may be used first, and processes implementing the techniques described herein can be applied afterwards as post-processing.

Figure 1:
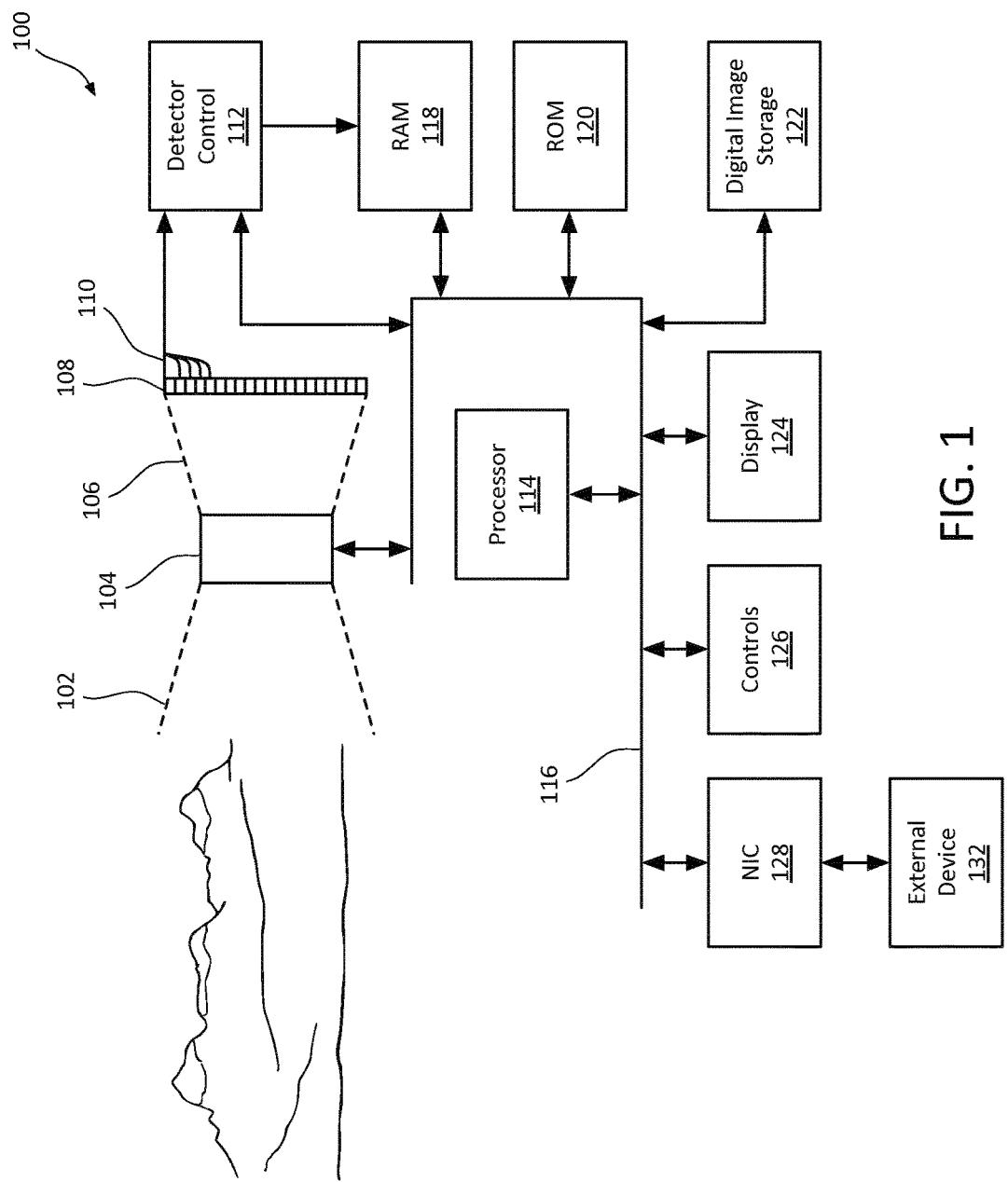
FIG. 1 is a block diagram of an image collection device according to various embodiments.

The techniques described herein may be implemented in any kind of device that can perform image processing, such as a personal computer executing image processing software, an image collection device, e.g., a camera, video camera, etc., that includes image processing functionality, a smart phone, a tablet computer, etc. For example, FIG. 1 is a block diagram of an image collection device 100 according to various embodiments. In FIG. 1, light 102 reflected from a scene can be collected and focused by optical elements 104. The focused light 106 can be projected onto a detector 108, which may be, for example, a charge coupled device or other kind of light detection system. Focused light 106 can be converted by detector 108 into an electrical signal, and can be then transferred over signal lines 110 to a detector controller 112. In detector controller 112, the individual signals from detector 108 can be converted into a digital image. The digital image may then be transferred by a processor 114 over a bus 116 to a random access memory (RAM) 118 for further processing. RAM 118 may be a dynamic RAM (DRAM), a static RAM (SRAM), a flash memory module, or other kind of computer memory.

Optical elements 104 may be connected to the bus 116 to allow optical elements 104 to be controlled by processor 114. For example, processor 114 may adjust the focus, the stop, or other properties of optical elements 104 through bus 116.

Processor 114 may be controlled by image collection and processing programs contained in a read only memory (ROM) 120 that can be accessible from bus 116. The programs do not have to be in a ROM, but may be contained in any type of long-term memory, such as a disk drive, a flash card, or an electrically erasable programmable read only memory (EEPROM), among others. Generally, the programs in ROM 120 may include the image coloring, re-coloring, and color correction procedures discussed with respect to FIGS. 2-10.

The digital image may be stored before or after processing in a separate digital image storage 122, such as a digital video tape, a recordable optical disk, a hard drive, and the like. Digital image storage 122 may also be combined with the program storage. For example, a disk drive may be used both to store both programs and digital images.

The images may be displayed on a display unit 124 that may be connected to bus 116. Controls 126 may also be connected to bus 116 to control the collection and processing of the images by processor 114. Such controls 126 may include keypads, selection knobs, and separate buttons for functions such as zooming, focusing, starting the collection of images, etc.

Images may be transferred from image collection device 100 through a network interface controller (NIC) 128 that may be connected to bus 116. NIC 128 may be connected to an external local area network (LAN) 130, which may be used to transfer the images to an external device 132 located on LAN 130.

The arrangement of the functional blocks presented above is only one possible arrangement, and any number of other arrangements may be used. For example, NIC 128 may be directly coupled to an area of RAM 118 to allow direct memory access, or DMA, transfers to occur directly to and from RAM 118 of the digital collection device. This may accelerate data transfers when a large amount of data is involved, such as in a high definition digital video camera. Further, in other arrangements controls 126 and display 128 may be combined into a single unit. In yet other combinations, display 128 may be directly connected to detector controller 112 to off-load the display function from processor 114.

Figure 2:
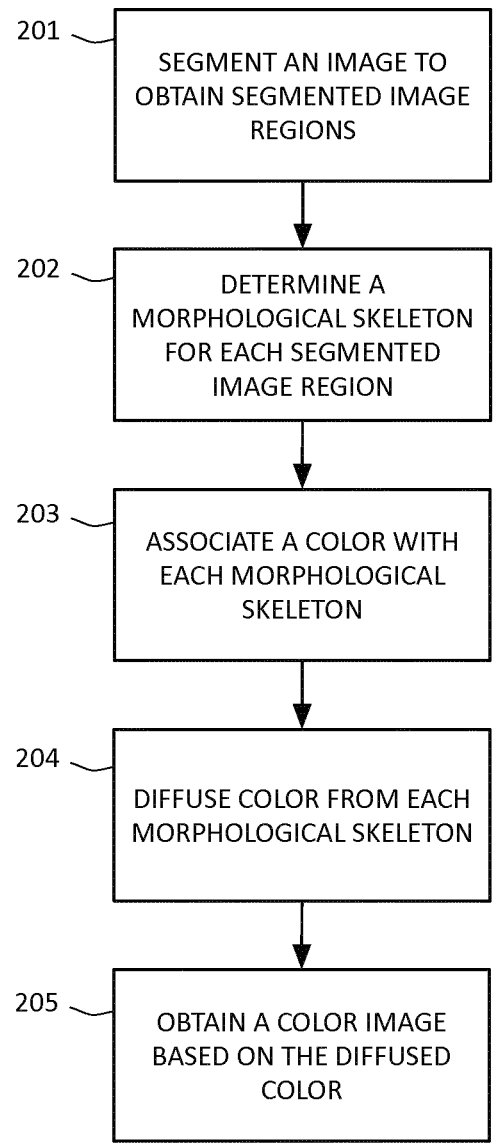
FIG. 2 is a flowchart of an example of a method according to various embodiments.

FIG. 2 is a flowchart of an example of a method according to various embodiments. In some embodiments, the method may be implemented to colorize grayscale images. In some embodiments, the method may be implemented to re-color a color image. Likewise, in some embodiments the method may be used as a post-processing step to help correct visual artifacts that can result from other colorizing or re-coloring processes. FIGS. 3-8 are conceptual drawings to illustrate an example of an implementation of the method of FIG. 2 to colorize grayscale images according to various embodiments. During the description of the method of FIG. 2 below, FIGS. 3-8 will be referenced in order to illustrate how the method of FIG. 2 can be implemented according to one particular embodiment.

Figure 3:
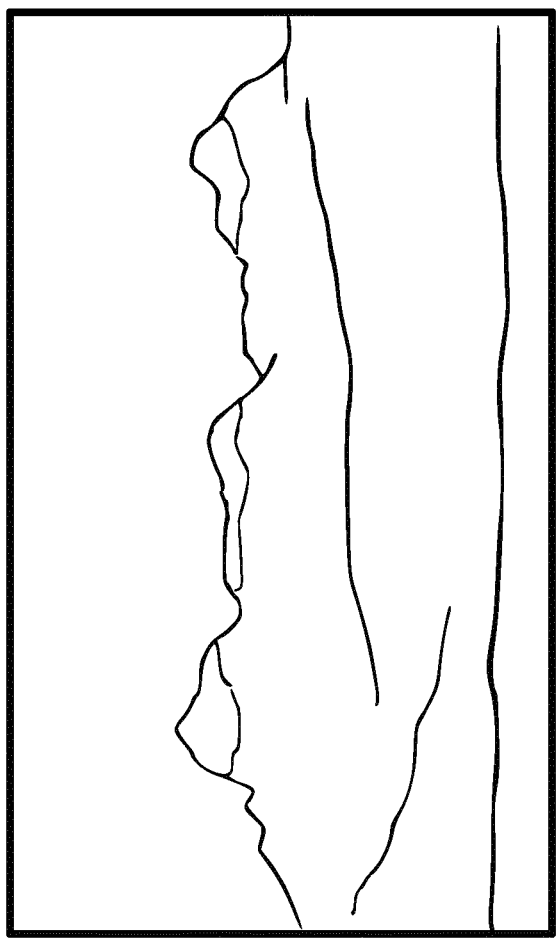
FIG. 3 is an illustration of an input greyscale image to be colorized according to various embodiments.
Figure 4:
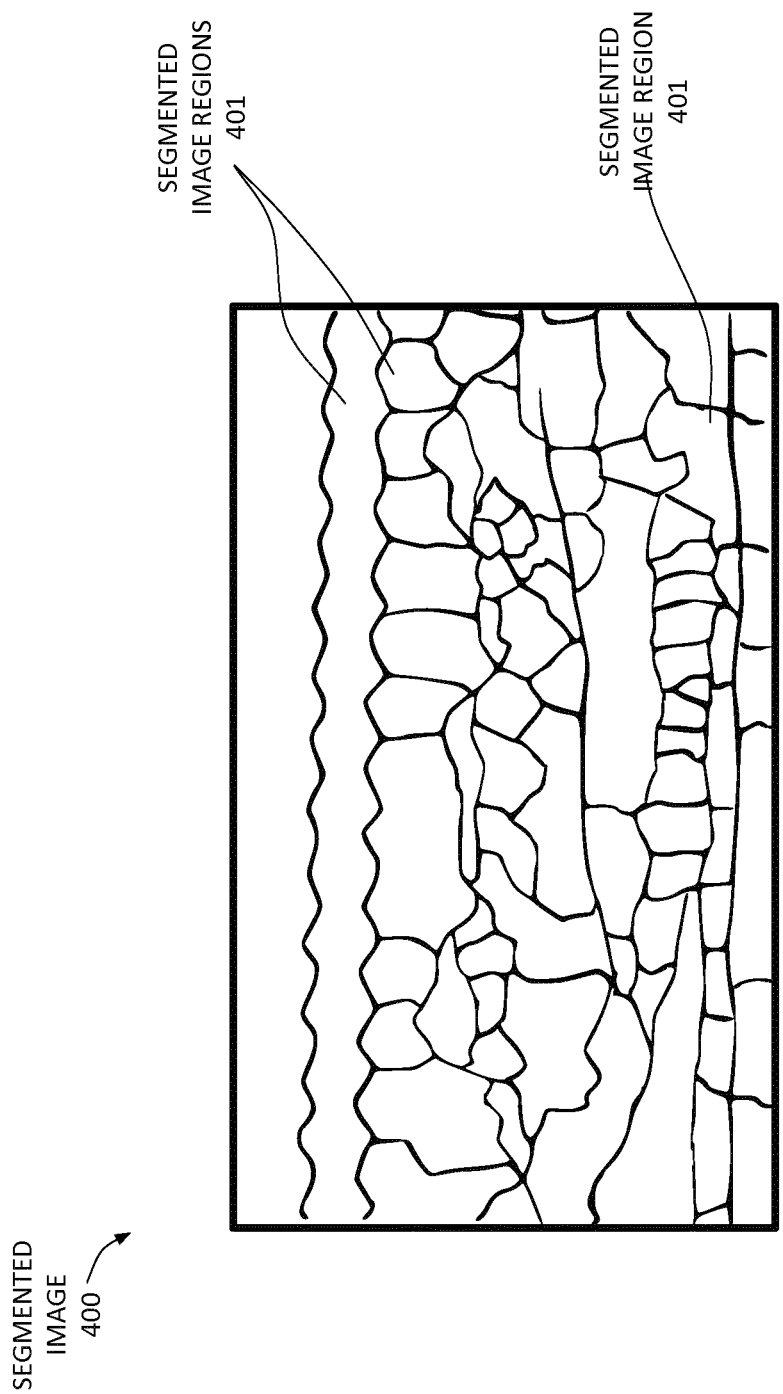
FIG. 4 illustrates a segmented image that includes segmented image regions resulting from segmenting a greyscale image according to various embodiments.

Referring to FIG. 2, an image to be processed (e.g., a grayscale image to be colorized or a color image to be re-colored) can be obtained, for example, from the memory of an image processing device, such as digital image storage 122 of image collection device 100. For example, FIG. 3 is an illustration of an input greyscale image 300 to be colorized. The image can be segmented (201) to obtain segmented image regions. For example, FIG. 4 illustrates a segmented image 400 that includes segmented image regions 401 resulting from segmenting greyscale image 300.

Segmentation can include superpixel segmentation, which can estimate consistent regions by grouping pixels into perceptually meaningful regions. The pixel groupings can capture image redundancy, provide a convenient primitive from which to compute image features, and reduce the complexity of subsequent image processing tasks. In some cases a superpixel algorithm, by itself, may create over-segmentation or under-segmentation, which may lead to additional color artifacts. In various embodiments, segmentation can include a modified superpixel segmentation that may mitigate creation of additional artifacts. A modified superpixel segmentation can include over-segmenting the image and then merging superpixels that are spatially close and have similar statistics (e.g., similar luminance mean and variance). For example, after a superpixel algorithm is applied, adjacent superpixels S1 and S2 can be merged if:

$$\sqrt{(\mu_{S2}-\mu_{S1})^2+(\sigma_{S2}-\sigma_{S1})^2}<T \qquad (1)$$

Where $\mu_{S2}$, $\mu_{S1}$ and $\sigma_{S2}$, $\sigma_{S1}$ are the mean and variance of the considered superpixels, respectively. T is a threshold, which can be set to 2.5.

It should be noted that superpixel segmentation is merely one type of segmentation that can be used. However, other methods for segmenting images can be implemented, as one skilled in the art will readily understand. In various embodiments, segmentation can be based on luminance information, for example, luminance components of an input image to be colorized such as grayscale image 300. In some embodiments in which a color image is to be re-colored (e.g., to remove artifacts caused by the colorization process), segmentation can be based on luminance information of the color image itself, while in other embodiments, segmentation can be based on luminance information of the original grayscale image that was colorized to result in the colorized image (if luminance information of the original grayscale image is obtained).

In various embodiments, the methods of FIG. 2 and FIGS. 3-8 can be applied to grayscale and color images regardless of any previous image processing that the images may have undergone, i.e., independent of any previous image processing. In various embodiments, the methods may be used in post-processing of images to correct artifacts that can result from previous image processing.

After the image has been segmented, a morphological skeleton (e.g., a medial axis representation) can be determined (202) for each segmented image region. In other words, the segmented image regions can provide a basis for determining morphological skeletons. The morphological skeletons can be used as starting locations for color in a color diffusion process. Morphological skeletons may provide better color diffusion results in comparison to using other types of strokes or using points for the starting locations. In particular, morphological skeletons may span the segmented image regions better, such that color can be more evenly diffused throughout the segmented image regions. This may reduce undesirable desaturation that can occur near the edges of the segmented image regions, particularly when a single point within each segmented image region is used as the starting location.

Figure 5:
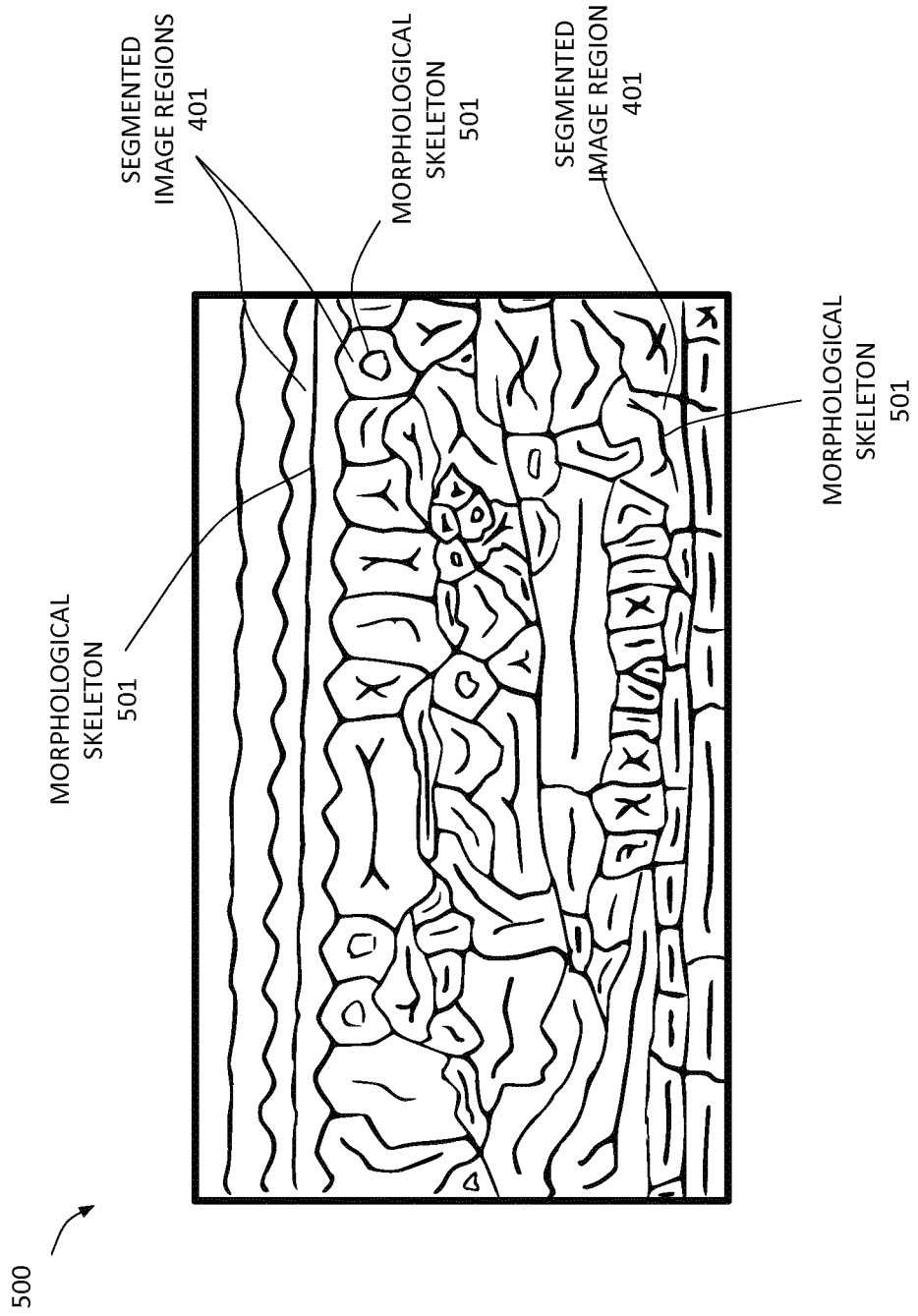
FIG. 5 is a conceptual illustration showing a segmented image including a morphological skeleton determined for each segmented image region according to various embodiments.

FIG. 5 is a conceptual illustration 500 showing a segmented image including a morphological skeleton 501 determined for each segmented image region 401.

A color can be associated (203) with each morphological skeleton. In other words, each morphological skeleton can be seeded with color. In various embodiments, the color associated with each morphological skeleton can be based on, for example, an input color image to be re-colored, a color template image, user input, etc.

As described above, the segmented image regions can provide a basis for determining morphological skeletons. In various embodiments, the segmented image regions also can provide a basis for determining the colors to be associated with the morphological skeletons. For example, in various embodiments directed to re-coloring an input color image, the color to associate with each morphological skeleton can be determined in a variety of ways. For example, in some embodiments the color associated with each morphological skeleton can be based on the color in the segmented image region in the input color image. For example, associating color with each morphological skeleton can include determining a most frequent color of the segmented image region in the input color image. In various embodiments, the color associated with each morphological skeleton can be determined based on a mean color, a median color, etc., of the segmented image region in the input color image. Other ways to determine the color to associate with each morphological skeleton can include, for example, clustering the hues in the input color image and assigning a closest hue to each segmented image region, using one or more of various voting schemes, etc., as one skilled in the art will readily understand.

In various embodiments directed to colorizing an input grayscale image, the color to associate with each morphological skeleton can be determined in a variety of ways. For example, in some embodiments the input grayscale image showing the boundaries of the segmented image regions can be displayed to a user, and the user can input a desired color for each segmented image region. The desired colors can be associated with the corresponding morphological skeletons. In other embodiments, a color image may be used as a template for the determining colors associated with morphological skeletons. For example, the color template image may be segmented as well, and the segmented image regions of the color template image may be matched with the segmented image regions of the input greyscale image, e.g., based on texture-mapping, etc. Colors can be associated with the morphological skeletons based on, for example, a most frequent color, a mean color, a median color, etc., of the segmented image region in the color template image that matches the segmented image region in the input grayscale image.

Figure 6:
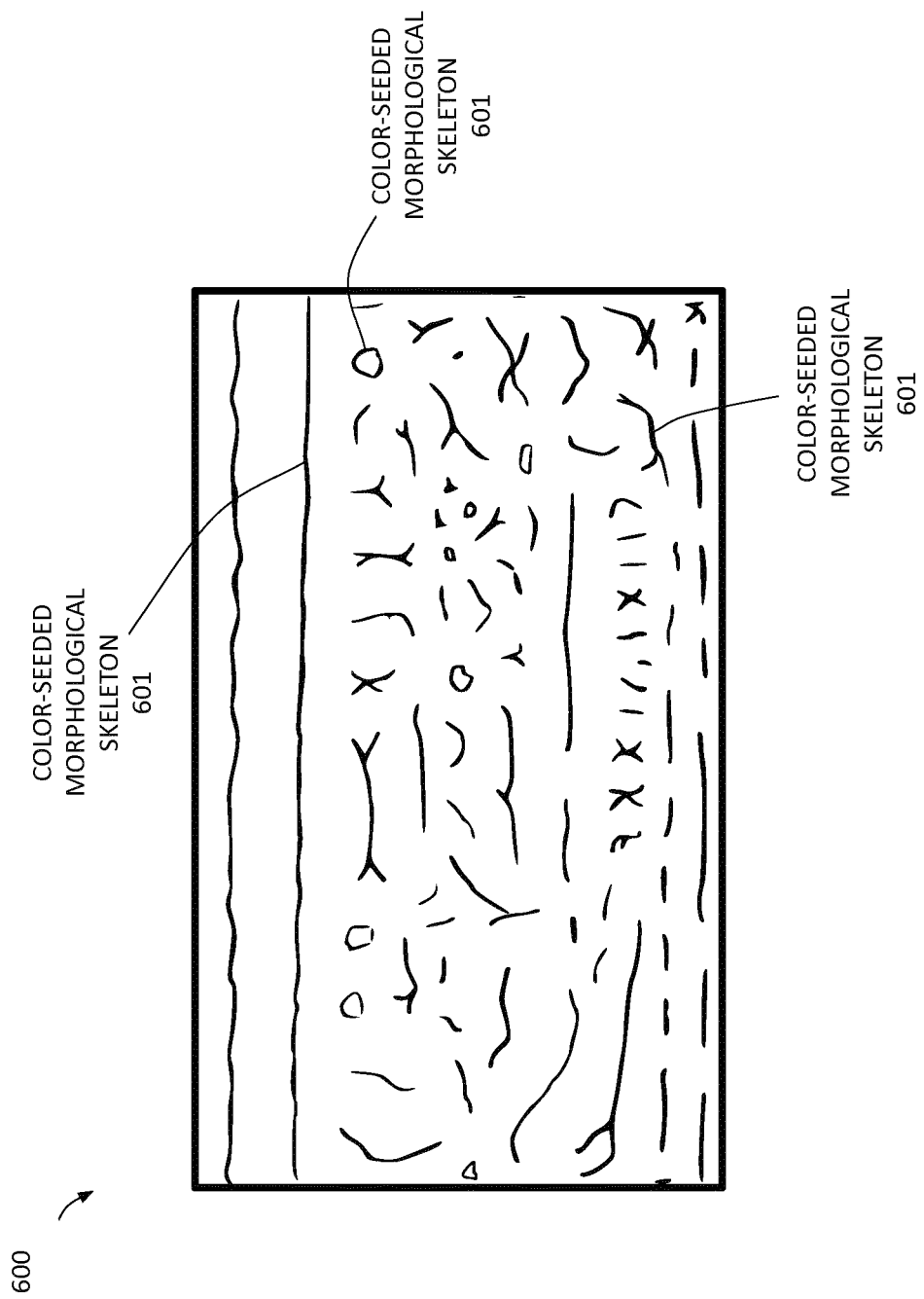
FIG. 6 is a conceptual illustration showing color-seeded morphological skeletons according to various embodiments.

FIG. 6 is a conceptual illustration 600 showing color-seeded morphological skeletons 601, which are obtained by associating color with morphological skeletons 501.

Color can be diffused (204) from each morphological skeleton. In various embodiments, color diffusion from morphological skeletons can be based, for example, on Levin's algorithm, which can take into account the luminance of nearby pixels, such that if the luminance is similar the color is diffused to the nearby pixel, and if the luminance is not similar the color is not diffused. At any given pixel, color diffusion from one morphological skeleton potentially can overlap with color diffusion from one or more other morphological skeletons. In these cases, various methods can be used to determine the final color assigned to the pixel. In various embodiments, for example, a confidence value can be determined for the diffused color from each morphological skeleton. The confidence values can be compared, and the diffused color with the highest confidence value can be assigned to the pixel. In other embodiments, a weight can be determined for the diffused color from each morphological skeleton, and the diffused colors can be combined based on the weights to obtain a final color value assigned to the pixel. In various embodiments, weights and/or confidence levels can be based on factors including, for example, distance from the morphological skeleton, morphological skeleton size, differences between the overlapping diffused colors, etc. Other methods of diffusing color may be used, such as methods that take into account texture, boundaries, etc., such as one skilled in the art will readily understand.

Figure 7:
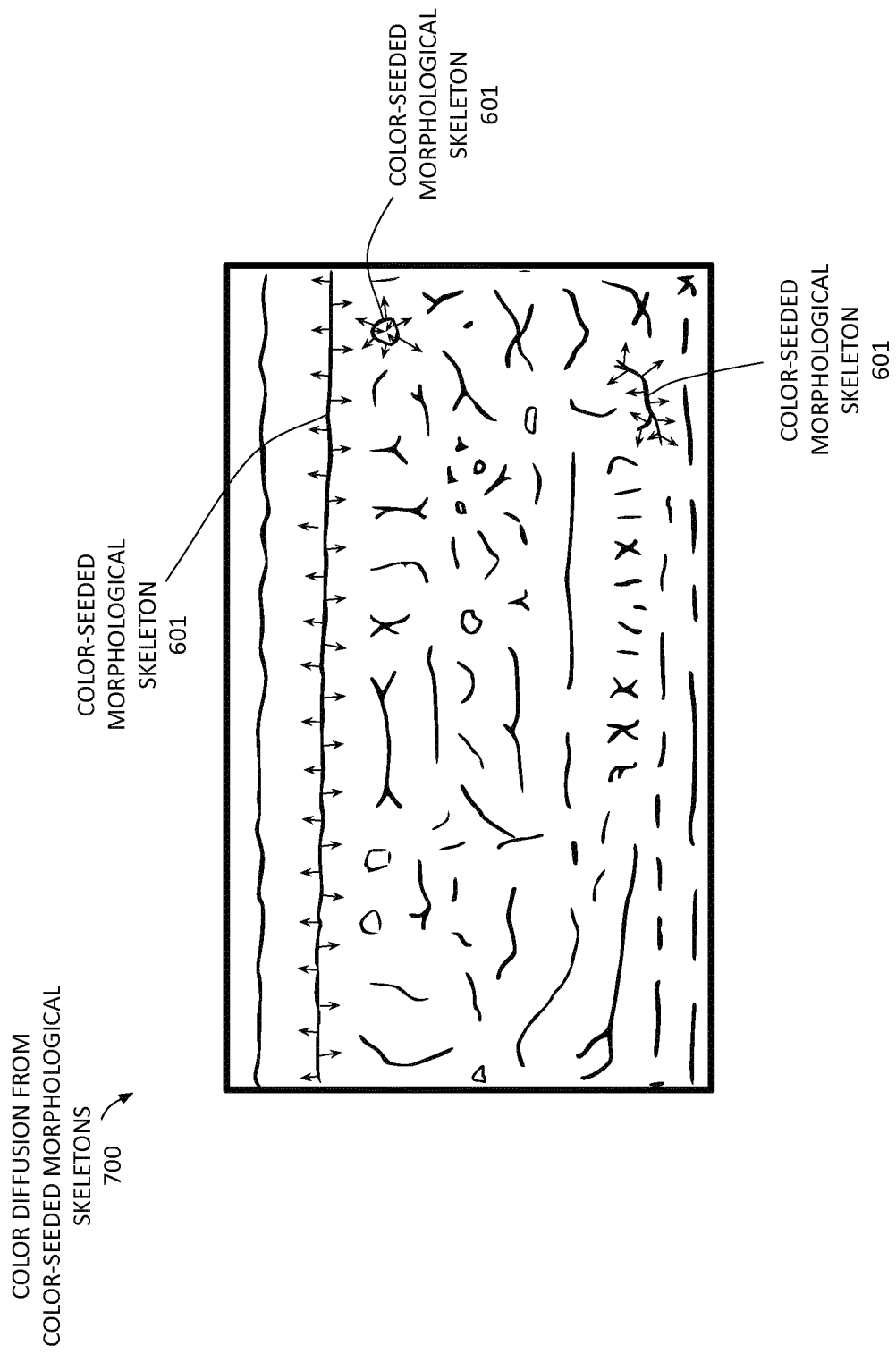
FIG. 7 is a conceptual illustration showing color diffusion from color-seeded morphological skeletons according to various embodiments.

FIG. 7 is a conceptual illustration 700 showing color diffusion from color-seeded morphological skeletons 601. The color diffusion is illustrated by small arrows extending from the color-seeded morphological skeletons. For the sake of clarity, color diffusion is illustrated for only some of the color-seeded morphological skeletons, but it should be understood that color is diffused from all of the color-seeded morphological skeletons.

Figure 8:
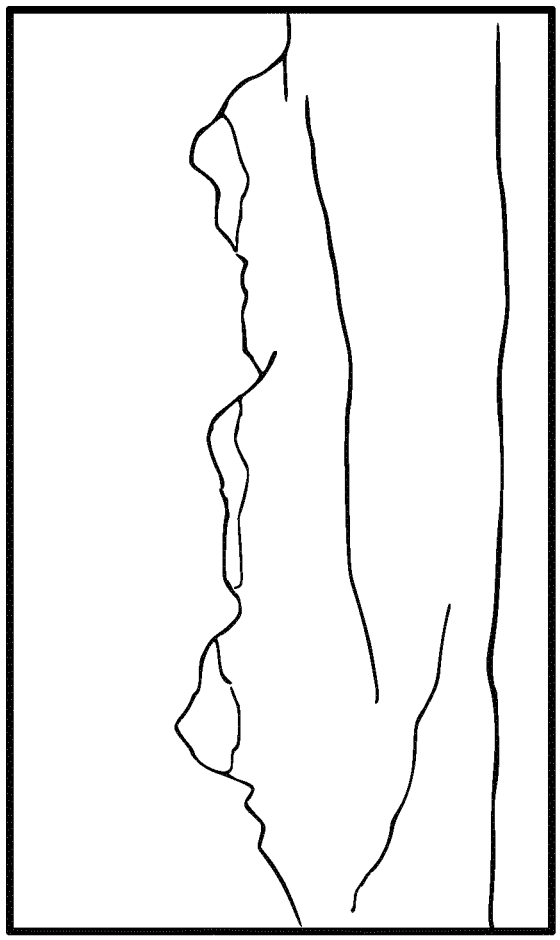
FIG. 8 is a conceptual illustration of a colorized image of an input grayscale image according to various embodiments.

A color image can be obtained (205) based on the diffused color. For example, in various embodiments the color image can be the direct result of the color diffusion. In some embodiments, other processing can be applied to the result of the color diffusion to obtain a final color image. Other processing can include, for example, gamma correction, color saturation adjustment, etc. FIG. 8 is a conceptual illustration of a colorized image 800 of input grayscale image 300 that can result from the color diffusion of color-seeded morphological skeletons 601.

Figure 9:
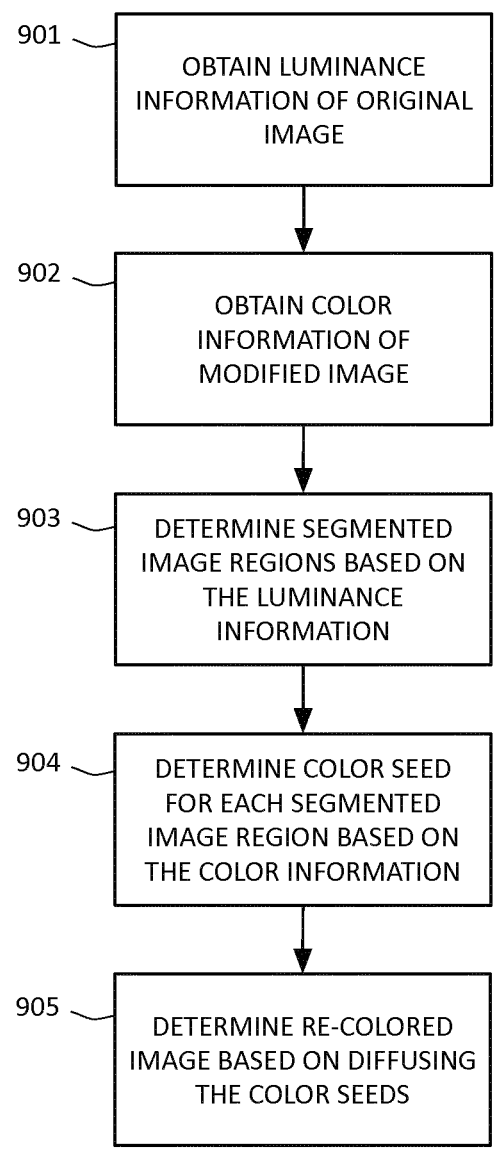
FIG. 9 is a flowchart of an example of another method according to various embodiments.

FIG. 9 is a flowchart of an example of another method according to various embodiments. The method may be implemented to re-color a color image, for example, as a post-processing step to help correct visual artifacts that can result from other colorizing or re-coloring processes. In this regard, the method may help reduce or eliminate typical artifacts caused by automatic color image processing/mapping methods, such as color transfer, color harmonization, colorization of greyscale pictures, etc. In particular, some conventional image processing methods might produce color inconsistency in areas where the color and/or luminance values change smoothly in the original picture. For example, some conventional colorization methods can create spatial irregularities, strong artificial color edges, etc., that are not present in the original image. The method of FIG. 9 may be viewed as a regularization method that can be implemented as a post-processing for improving the visual quality of any color image processing method.

Figure 10A:
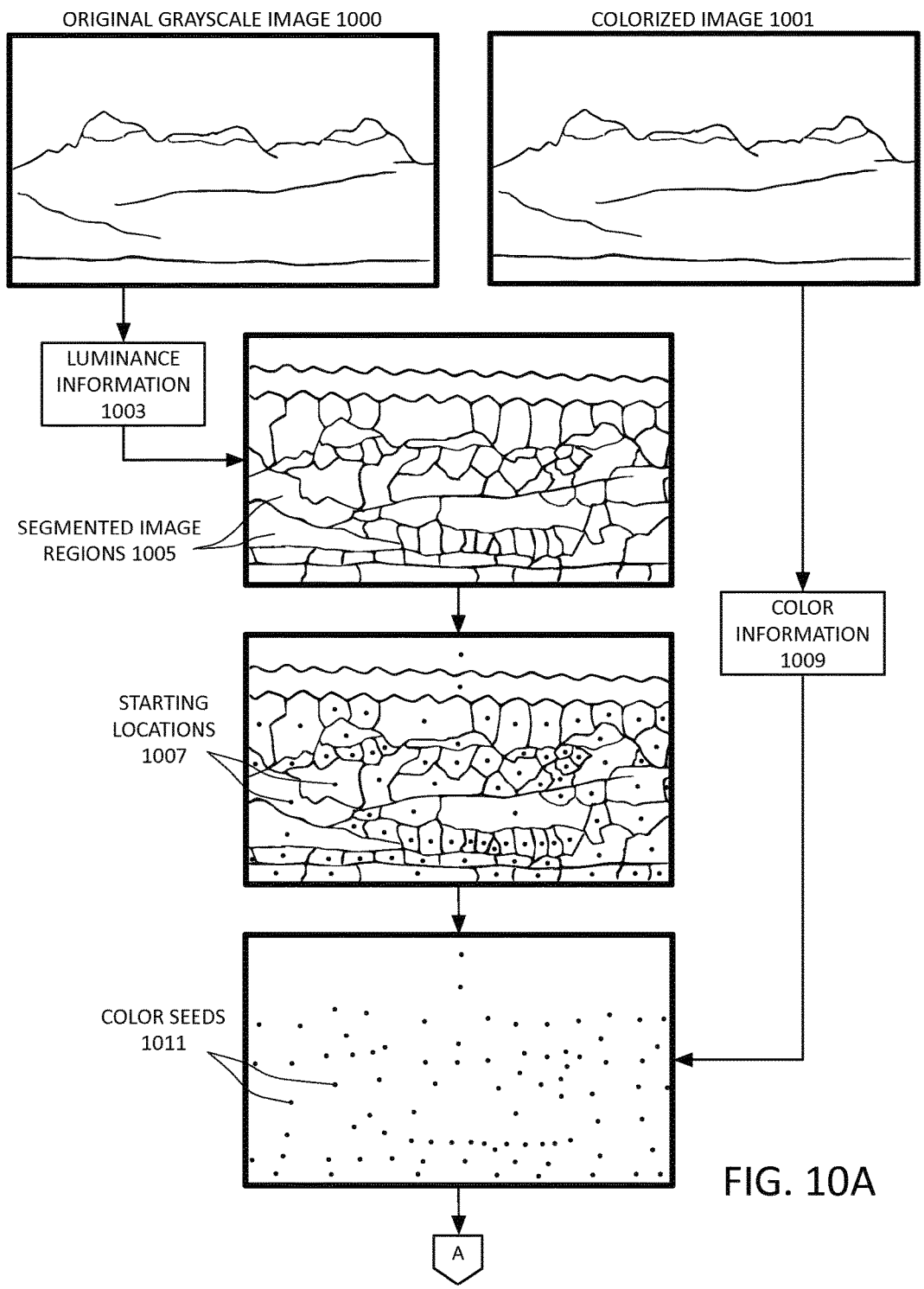
FIGS. 10A-B show a conceptual illustration of an example of an implementation of the method of FIG. 9 to re-color a colorized image of an original grayscale image according to various embodiments.
Figure 10B:
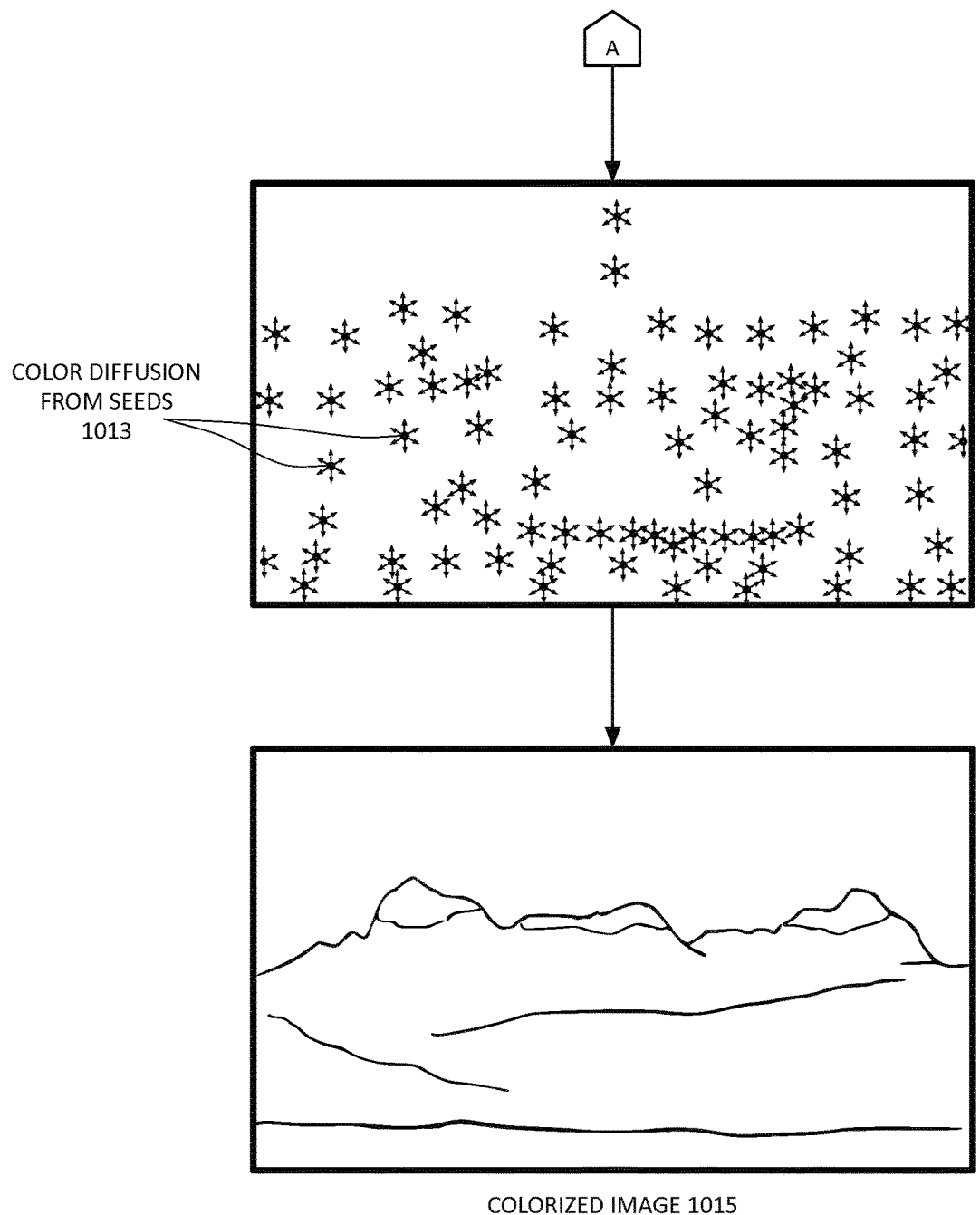

FIGS. 10A-B show a conceptual illustration of an example of an implementation of the method of FIG. 9 to re-color a colorized image of an original grayscale image. During the description of the method of FIG. 9 below, FIGS. 10A-B will be referenced in order to illustrate how the method of FIG. 9 can be implemented according to one particular embodiment.

Referring to FIG. 9, luminance information of an original image can be obtained (901). The luminance information can include, for example, luminance components of the original image, such as values of a luminance channel at each pixel. Color information of a modified image can be obtained (902). The color information can include, for example, color components of the modified image, such as values of color channels at each pixel. The modified image can be an image resulting from image processing of the original image. In various embodiments, the modified image can be a colorized version of an original grayscale image. For example, in the implementation shown in FIGS. 10A-B, an original grayscale image 1000 has been colorized, for example using a conventional colorization method, resulting in a colorized image 1001. In some embodiments, the modified image can be a re-colored version of an original color image.

Segmented image regions can be determined (903) based on the luminance information of the original image. As in the method described above with respect to the method of FIG. 2, segmentation can include superpixel segmentation. In some cases superpixel algorithm, by itself, may create over-segmentation or under-segmentation, which may lead to additional color artifacts. In various embodiments, segmentation can include a modified superpixel segmentation, which can include over-segmenting the image and then merging superpixels that are spatially close and have similar statistics (e.g., similar luminance mean and variance). For example, after a superpixel algorithm is applied, adjacent superpixels S1 and S2 can be merged based on Equation (1) above, for example. Although superpixel segmentation is described herein as one method of segmentation, other methods for segmenting images can be implemented, as one skilled in the art will readily understand.

FIG. 10A shows luminance information 1003 can be obtained from original grayscale image 1000, and segmented image regions 1005 can be determined based on the luminance information.

A color seed can be determined (904) for each segmented image region based on the color information of the modified image. In various embodiments, determining a color seed for each segmented image region can include determining a starting location, such as a morphological skeleton, a point, etc., corresponding to the segmented image region and associating color with the morphological skeleton, where the associated color is based on the color information of the modified image. Techniques described above with respect to the method of FIG. 2 can be applied, for example, to determine morphological skeletons and seed the morphological skeletons with color, as one skilled in the art will readily understand. Similar techniques can be used to determine points or other shapes as starting locations, and to seed the starting locations with color. For example, each starting location can be determined as a center point of each segmented image region.

FIG. 10A shows a starting location 1007 determined for each segmented image region. For the sake of clarity, starting locations 1007 are shown as dots in FIG. 10A. However, it should be understood that the starting locations can be, e.g., points, morphological skeletons, other strokes, etc. Color information 1009 can be obtained from colorized image 1001, and starting locations 1007 can be seeded with color based on the color information to obtain color seeds 1011.

It should be noted that the segmented image regions can provide a basis for determining the colors of the color seeds. For example, in various embodiments the color associated with each morphological skeleton, point, etc., can be based on the color of the segmented image region in the modified image, e.g., the colorized image in the example of FIGS. 10A-10B. For example, associating color with each morphological skeleton, point, etc., can include determining a most frequent color of the segmented image region in the modified image. In various embodiments, the color associated with each morphological skeleton, point, etc., can be determined based on a mean color, a median color, etc., of the segmented image region in the modified image. Other ways to determine the color to associate with each morphological skeleton, point, etc., can include, for example, clustering the hues in the modified image and assigning a closest hue to each segmented image region, using one or more of various voting schemes, etc., as one skilled in the art will readily understand.

A re-colored image can be determined (905) based on diffusing the color seeds. As described above with respect to FIG. 2, in various embodiments color diffusion can be based, for example, on Levin's algorithm, which can take into account the luminance of nearby pixels, such that if the luminance is similar the color is diffused to the nearby pixel, and if the luminance is not similar the color is not diffused. In this case, the luminance of each pixel can be based on the luminance information, such as luminance components, of pixels in the original image. Other methods of diffusing color may be used, such as methods that take into account texture, boundaries, etc., such as one skilled in the art will readily understand. Color components can be determined based on diffusing the color seeds, and the re-colored image be determined by combining the color components with the luminance components of the original image.

In FIG. 10B, color diffusion 1013 from seeds is illustrated by small arrows extending from color seeds 1011. Re-colored image 1015 can be determined based on color diffusion 1013. As in the method described above with respect to FIG. 2, in various embodiments the re-colored image can be the direct result of the color diffusion. In some embodiments, other processing can be applied to the result of the color diffusion to obtain a final re-colored image. Other processing can include, for example, gamma correction, color saturation adjustment, etc.

Figure 11:
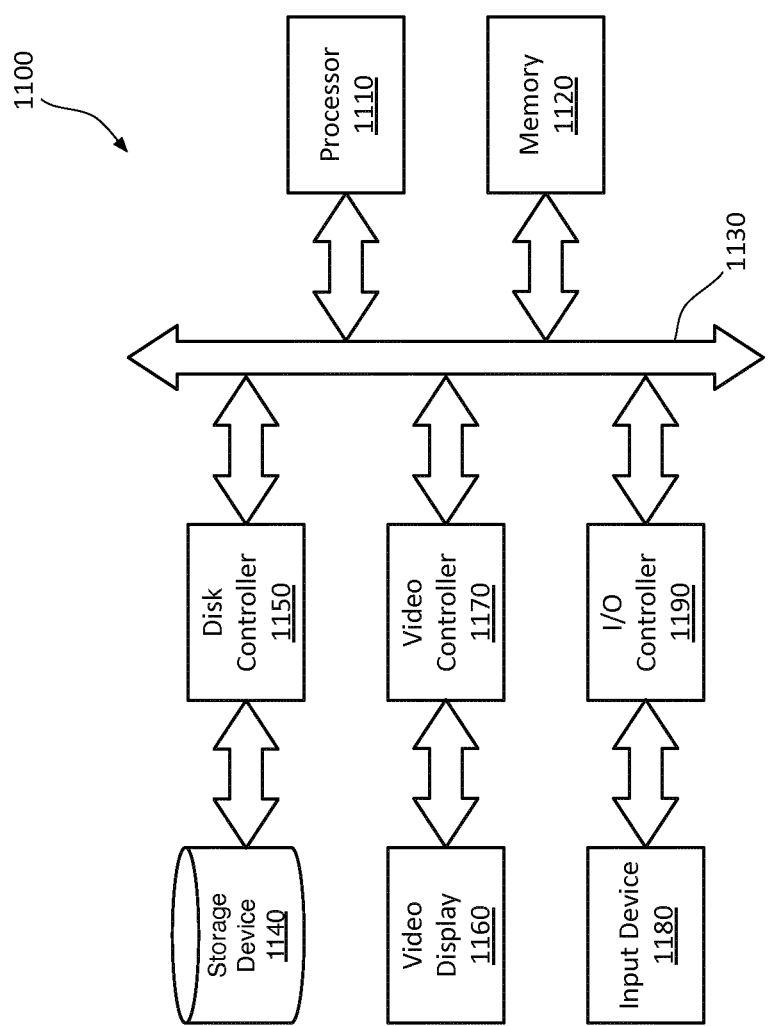
FIG. 11 illustrates another example of an apparatus according to various embodiments.

FIG. 11 illustrates another example of an apparatus according to various embodiments. FIG. 11 is a block diagram of an apparatus 1100 for implementing various techniques described above for coloring and re-coloring digital images. Apparatus 1100 may be implemented, for example, as a general-purpose computing platform.

Apparatus 1100 can include a processor 1110 for executing the computer-executable programs that perform various techniques described above. The programs may be stored in a memory 1120, which may also store image data. A bus 1130 can connect processor 1110 and memory 1120 to each other and to other components of apparatus 1100. In some embodiments, apparatus 1100 may include multiple processors or processors with multiple processing cores, which may execute various parts of programs in parallel.

A mass storage device 1140 can be connected to bus 1130 via a disk controller 1150. Mass storage device 1140 may contain image or video data, as well as an operating system, other programs, other data, etc. Disk controller 1150 may operate according to Serial Advanced Technology Advancement (SATA), Small Computer System Interface (SCSI), or other standards, and may provide connection to multiple mass storage devices.

A video display 1160 can be connected to bus 1130 via a video controller 1170. Video controller 1170 may provide its own memory and graphics-processing capability for use in implementing or accelerating certain aspects of the colorization, re-colorization, or color correction processes, as well as for providing the functions of image and UI display.

An input device 1180 can be connected to bus 1130 via an input/output (I/O) controller 1190. I/O controller 1190 may utilize one or more of USB, IEEE 1394a, or other standards. Multiple input devices may be connected, such as keyboards, mice, and trackpads. Image and video capture devices may also be connected to the system through I/O controller 1190 or additional I/O controllers implementing other I/O standards. Networking functionality may be provided by I/O controller 1190 or a separate I/O controller.

It will be recognized by one skilled in the art that various aspects of the methods of the present disclosure may be executed in parallel on multiple systems to provide faster processing. For instance, in the case of processing a video file, frames may be divided among tens or hundreds of computing systems to provide parallel processing. Particular components, such as video display 1160, may be omitted in some systems in some operating environments. Furthermore, multiple systems may utilize shared storage accessed via an I/O bus or via a network.

It will be further recognized by one skilled in the art that apparatus 1100 may be implemented within an image capture device such as a digital still camera or digital video camera. Various techniques disclosed herein may be implemented by apparatus 1100 at the time of image capture to color, re-color, or perform color correction.

Various embodiments can include a system including a processor and a memory storing instructions configured to cause the processor to obtain luminance information of a first image, obtain color information of a second image, the second image being an image resulting from image processing of the first image, determine a plurality of segmented image regions based on the luminance information of the first image, determine a color seed for each segmented image region based on the color information of the second image, and determine a third image based on diffusing the color seeds of the segmented image regions. In various embodiments, determining the segmented image regions includes performing superpixel segmentation based on the luminance information of the first image. In various embodiments, determining the segmented image regions further includes merging two or more superpixels, the superpixels resulting from performing the superpixel segmentation. In various embodiments, determining the color seed for each segmented image region includes determining a point within the segmented image region and associating color with the point, the associated color being based on the color information of the second image. In various embodiments, determining the color seed for each segmented image region includes determining a morphological skeleton corresponding to the segmented image region and associating color with the morphological skeleton, the associated color being based on the color information of the second image. In various embodiments, associating color with the morphological skeleton includes determining a most frequent color of the segmented image region in the second image and associating the most frequent color with the morphological skeleton. In various embodiments, determining the third image based on diffusing the color seeds includes diffusing the color seeds based on the luminance information. In various embodiments, the luminance information of the first image includes luminance components of the first image, and determining the third image includes diffusing the color seeds to obtain color components and combining the color components with the luminance components of the first image.

Various embodiments can include a method including obtaining luminance information of a first image, obtaining color information of a second image, the second image being an image resulting from image processing of the first image, determining a plurality of segmented image regions based on the luminance information of the first image, determining a color seed for each segmented image region based on the color information of the second image, and determining a third image based on diffusing the color seeds of the segmented image regions. In various embodiments, determining the segmented image regions includes performing superpixel segmentation based on the luminance information of the first image. In various embodiments, determining the segmented image regions further includes merging two or more superpixels, the superpixels resulting from performing the superpixel segmentation. In various embodiments, determining the color seed for each segmented image region includes determining a point within the segmented image region and associating color with the point, the associated color being based on the color information of the second image. In various embodiments, determining the color seed for each segmented image region includes determining a morphological skeleton corresponding to the segmented image region and associating color with the morphological skeleton, the associated color being based on the color information of the second image. In various embodiments, associating color with the morphological skeleton includes determining a most frequent color of the segmented image region in the second image and associating the most frequent color with the morphological skeleton. In various embodiments, determining the third image based on diffusing the color seeds includes diffusing the color seeds based on the luminance information. In various embodiments, the luminance information of the first image includes luminance components of the first image, and determining the third image includes diffusing the color seeds to obtain color components and combining the color components with the luminance components of the first image.

Various embodiments can include a non-transitory computer-readable medium storing computer-executable instructions executable to perform a method including obtaining luminance information of a first image, obtaining color information of a second image, the second image being an image resulting from image processing of the first image, determining a plurality of segmented image regions based on the luminance information of the first image, determining a color seed for each segmented image region based on the color information of the second image, and determining a third image based on diffusing the color seeds of the segmented image regions. In various embodiments, determining the segmented image regions includes performing superpixel segmentation based on the luminance information of the first image. In various embodiments, determining the segmented image regions further includes merging two or more superpixels, the superpixels resulting from performing the superpixel segmentation. In various embodiments, determining the color seed for each segmented image region includes determining a point within the segmented image region and associating color with the point, the associated color being based on the color information of the second image. In various embodiments, determining the color seed for each segmented image region includes determining a morphological skeleton corresponding to the segmented image region and associating color with the morphological skeleton, the associated color being based on the color information of the second image. In various embodiments, associating color with the morphological skeleton includes determining a most frequent color of the segmented image region in the second image and associating the most frequent color with the morphological skeleton. In various embodiments, determining the third image based on diffusing the color seeds includes diffusing the color seeds based on the luminance information. In various embodiments, the luminance information of the first image includes luminance components of the first image, and determining the third image includes diffusing the color seeds to obtain color components and combining the color components with the luminance components of the first image.

It should also be appreciated that although various examples of various embodiments have been shown and described in detail herein, those skilled in the art can readily devise other varied embodiments that still remain within the scope of this disclosure.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry, electrical components, optical components, etc., embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function, software in any form, including, therefore, firmware, microcode or the like, combined with appropriate circuitry for executing that software to perform the function, etc. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A device comprising a processor configured to:
    obtain luminance information of a first image;
    obtain color information of a second image, the second image being an image resulting from image processing of the first image;
    determine a plurality of segmented image regions by performing superpixel segmentation based on the luminance information of the first image;
    determine a color seed for each segmented image region based on the color information of the second image; and
    determine a third image based on diffusing the color seeds of the segmented image regions.

2. The device of claim 1, wherein determining the segmented image regions further includes merging two or more superpixels, the superpixels resulting from performing the superpixel segmentation.

3. The device of claim 1, wherein determining the color seed for each segmented image region includes determining a point within the segmented image region and associating color with the point, the associated color being based on the color information of the second image.

4. The device of claim 1, wherein determining the color seed for each segmented image region includes determining a morphological skeleton corresponding to the segmented image region and
    associating color with the morphological skeleton, the associated color being based on the color information of the second image.

5. The device of claim 4, wherein associating color with the morphological skeleton includes determining a most frequent color of the segmented image region in the second image and associating the most frequent color with the morphological skeleton.

6. The device of claim 1, wherein determining the third image based on diffusing the color seeds includes diffusing the color seeds based on the luminance information.

7. The device of claim 6, wherein the luminance information of the first image includes luminance components of the first image, and wherein determining the third image includes diffusing the color seeds to obtain color components and combining the color components with the luminance components of the first image.

8. A method comprising:
    obtaining luminance information of a first image;
    obtaining color information of a second image, the second image being an image resulting from image processing of the first image;
    determining a plurality of segmented image regions by performing superpixel segmentation based on the luminance information of the first image;
    determining a color seed for each segmented image region based on the color information of the second image; and
    determining a third image based on diffusing the color seeds of the segmented image regions.

9. The method of claim 7, wherein determining the segmented image regions further includes merging two or more superpixels, the superpixels resulting from performing the superpixel segmentation.

10. The method of claim 7, wherein determining the color seed for each segmented image region includes determining a point within the segmented image region and associating color with the point, the associated color being based on the color information of the second image.

11. The method of claim 7, wherein determining the color seed for each segmented image region includes determining a morphological skeleton corresponding to the segmented image region and associating color with the morphological skeleton, the associated color being based on the color information of the second image.

12. The method of claim 11, wherein associating color with the morphological skeleton includes determining a most frequent color of the segmented image region in the second image and associating the most frequent color with the morphological skeleton.

13. The method of claim 7, wherein determining the third image based on diffusing the color seeds includes diffusing the color seeds based on the luminance information.

14. The method of claim 13, wherein the luminance information of the first image includes luminance components of the first image, and wherein determining the third image includes diffusing the color seeds to obtain color components and combining the color components with the luminance components of the first image.

15. A non-transitory computer-readable medium storing computer-executable instructions executable to perform a method comprising:
   obtaining luminance information of a first image;
   obtaining color information of a second image, the second image being an image resulting from image processing of the first image;
   determining a plurality of segmented image regions by performing superpixel segmentation based on the luminance information of the first image;
   determining a color seed for each segmented image region based on the color information of the second image; and
   determining a third image based on diffusing the color seeds of the segmented image regions.

16. The computer-readable medium of claim 15, wherein determining the segmented image regions further includes merging two or more superpixels, the superpixels resulting from performing the superpixel segmentation.

17. The computer-readable medium of claim 15, wherein determining the color seed for each segmented image region includes determining a point within the segmented image region and associating color with the point, the associated color being based on the color information of the second image.

* * * * *